United States Patent Office
3,425,988
Patented Feb. 4, 1969

3,425,988
POLYURETHANE POLYACRYLATE SEALANT COMPOSITIONS
Jeremy W. Gorman, West Hartford, and Alex S. Toback, Newington, Conn., assignors to Loctite Corporation, Newington, Conn., a corporation of Connecticut
No Drawing. Filed Jan. 27, 1965, Ser. No. 428,547
U.S. Cl. 260—47                                   10 Claims
Int. Cl. C08g 41/00, 22/04; C09k 3/10

ABSTRACT OF THE DISCLOSURE

Sealant compositions containing an acrylate terminated monomer and a peroxy polymerization initiator. The monomer is the reaction product of an organic polyisocyanate and an acrylate ester having an active hydrogen in the non-acrylate portion of the ester. Sealants of this type remain liquid when exposed to atmospheric oxygen, but will polymerize when oxygen is excluded such as when placed between non-porous surfaces.

---

This invention relates to sealant compositions and particularly to polymerizable polyacrylate sealant compositions exhibiting improved properties.

It has long been known that certain polyesters, and particularly polyacrylate ester monomers, may be employed in sealant compositions for anaerobically bonding metal surfaces, such compositions generally including particular organic peroxy initiators for the polymerization thereof. In the past the monomers have consistently possessed not only a plurality of terminal acrylate ester radicals but have also required that these terminal radicals be separated by aliphatic organic chains containing exclusively bivalent alkyl and/or alkyl ether groups. Upon polymerization these alkyl linked polyacrylates form hard, rigid polymers which quickly and effectively provide the desired sealant functions. However, the industry has long desired a sealant system which possessed in addition to the beneficial curing aspects of the anaerobic type materials, new, beneficial and improved physical properties which eliminated the hard and brittle character of the cured material.

It is, accordingly, a primary object of the present invention to provide a sealant system which fulfills this need and possesses some of these beneficial properties, particularly improved flexibility and distensibility.

Another object of the present invention is to provide a sealant system capable of rapid anaerobic bonding of adjacent metal surfaces yet remaining in a liquid storable condition for extended periods of time despite the presence of a polymerization initiator.

A further object of the invention is the provision of sealant compositions containing monomeric constituents which impart to the composition upon polymerization the additional desirable properties of flexibility and distensibility while exhibiting in the unpolymerized state a prolonged air stability.

In accordance with the present invention, it has now been found that these and additional objects may be effectuated by employing a particular group of new and improved monomers in the anaerobic sealant system without destroying the beneficial aspects of such systems.

The new monomers found effective for this purpose may be generally characterized as polyurethanes and polyureides or polyureas. More particularly, it has been found in accordance with the present invention that sealant compositions of the anaerobic curing category may be formulated using monomeric polyacrylate esters formed from organic polyisocyanates. Such monomeric polyesters generally have terminal acrylate radicals and at least two divalent polyurethane or polyureide groups linking the terminal radicals, the number of terminal radicals within the monomer never exceeding the number of urethane or ureide groups. These materials may be represented by the following general formula:

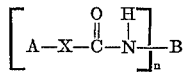

wherein X is selected from the group consisting of —O— and

radicals; R is a member selected from the group consisting of hydrogen and lower alkyl of 1 to 7 carbon atoms; A— represents the organic residue of an active hydrogen containing acrylic ester, i.e., an acrylic ester A—X—H wherein the active hydrogen has been removed; $n$ is an integer from 2 to 6 inclusive; and B is a polyvalent organic radical selected from the group consisting of alkyl, alkenyl, cycloalkyl, aryl, aralkyl, alkaryl and heterocyclic radicals both substituted and unsubstituted.

As used herein the terms "acrylate" and "polyacrylate" include the methyl, ethyl and halogen homologues thereof.

THE MONOMERS

The monomeric polyacrylate esters of this invention may be made in a variety of ways, however, the method which has proven most eminently suited involves the reaction of a monofunctionally substituted alkyl or aryl acrylate ester containing an active hydrogen atom on the functional substituent. This monofunctional, acrylate terminated material is reacted with a polyfunctional material, namely an organic polyisocyanate in suitable proportions so as to convert all of the isocyanate groups to urethane or ureide groups. The monofunctional alkyl and aryl acrylate esters are preferably the acrylates and methacrylates containing hydroxy and amino functional groups on the nonacrylate portion thereof. Acrylate esters suitable for use in this invention have the formula

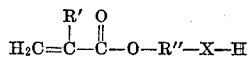

wherein X is selected from the group consisting of —O— and

R is selected from the group consisting of hydrogen and lower alkyl of 1 through 7 carbon atoms; R' is a member selected from the class consisting of hydrogen, chlorine and methyl and ethyl radicals; and R" is a divalent organic radical selected from the group consisting of lower alkylene of 1 through 8 carbon atoms, phenylene and naphthylene. These groups upon proper reaction with a polyisocyanate, yield a sealant monomer of the following general formula:

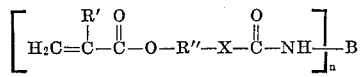

wherein B, X and $n$ have the meanings set forth hereinbefore; R' is a member selected from the class consisting of hydrogen, chlorine and methyl and ethyl radicals; and R'' is a divalent organic radical selected from the group consisting of lower alkylene of 1 to 8 carbon atoms, phenylene and naphthylene radicals.

The hydroxy and amine containing materials suitable for use in the preparation of the above monomeric products are exemplified by but not limited to such materials as hydroxy ethyl acrylate, hydroxy ethyl methacrylate, amino ethyl methacrylate, 3-hydroxy propyl methacrylate, amino propyl methacrylate, hydroxy hexyl acrylate, t-butylaminoethyl methacrylate, hydroxy octyl methacrylate and the like.

Illustrative of the polyisocyanates employed in the preparation of the new monomers are, among others, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, trimethylene diisocyanate, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine)pentane diisocyanate, tetrachlorophenylene diisocyanate-1,4, 3-heptene diisocyanate and transvinylene diisocyanate. Still other polyisocyanates that may be used are the higher molecular weight polyisocyanates obtained by reacting polyamines containing terminal, primary and secondary amine groups or polyhydric alcohols, for example, the alkane and alkene polyols such as glycerol, 1,2,6-hexanethanol, 1,5-pentanediol, ethylene glycol, polyethylene glycol, bisphenol-A, 4,4'-dihydroxyphenyldimethylmethane substituted bisphenol-A and the like with an excess of any of the above-described isocyanates. These higher molecular weight urethane or ureide polyisocyanates may be represented by the formula:

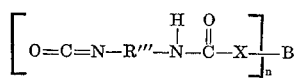

wherein B, X and $n$ have the meanings set forth hereinbefore and R''' is an organic radical selected from the group consisting of alkyl, alkenyl, cycloalkyl, aryl, aralkyl and alkaryl radicals of 2 to 20 carbon atoms.

Preferred organic polyisocyanates comprise the higher alkenyl diisocyanates, the cycloalkenyl diisocyanates and the aromatic diisocyanates containing more than 8 carbon atoms and preferably from 15 to 30 carbon atoms, such as, for example, octamethylene diisocyanate, durene diisocyanate, 4,4'-diphenyl diisocyanate, and the higher molecular weight polyisocyanate reaction products mentioned hereinbefore.

The proportions in which the reactants may be combined can be varied somewhat; however, it is generally preferred to employ the reactants in chemically equivalent amounts up to a slight excess, e.g., 1 equivalent excess, of the polyisocyanate. As used herein the expression "chemically equivalent amount" refers to the amount needed to furnish one isocyanate group per hydroxy or amine group.

The reactions may be accomplished in the presence or absence of diluents. Preferably diluents which include the hydrocarbons, such as aliphatic, cycloaliphatic and aromatic hydrocarbons, for example, benzene, toluene, cyclohexane, hexane, heptane and the like are employed but other diluents, such as methyl isobutyl ketone, diamyl ketone, isobutyl methacrylate, and cyclohexyl methacrylate can also be beneficially utilized if desired, especially where complete compatibility with the sealant system is desired.

The temperature employed in the reaction may also vary over a wide range. Where the components are combined in approximately chemical equivalent amounts or with slight excess of the isocyanate reactant, useful temperatures may vary from room temperature or below, e.g., 10° C. to 15° C., up to and including temperatures of 100° C. to 175° C. Where reacting the simpler isocyanates, the components are preferably combined at or near room temperature, such as temperatures ranging from 20° C. to 30° C. In the preparation of the high molecular weight isocyanate adducts using an excess of the isocyanate, the reactants may be combined at room temperature or preferably heated at temperatures ranging from about 40° C. to about 150° C. Reactions conducted at about 90° C. to 120° C. have been found to proceed quite smoothly.

Exemplary of the methods which may be employed in preparing the monomers utilizable in the sealant compositions of the present invention are the following examples which are given by way of illustration only and in no way constitute limitations on the present invention.

In a reaction vessel is placed approximately one mole, about 1.33 parts by weight of toluene diisocyanate together with a minute quantity of polymerization inhibitor and in some instances an inert solvent. To this is slowly added about two moles, 1.0 part by weight of hydroxy ethyl methacrylate over a period of time sufficient to permit the exothermic reaction to proceed smoothly, causing only a gradual rise in temperature. The reaction mixture is slowly cooled to room temperature with stirring after all of the hydroxy ethyl methacrylate has been added. The resultant product is a light yellow, slightly viscous liquid suitable for use in the sealant formulation without further purification. The corresponding polyureide is prepared by substituting amino ethyl methacrylate for the hydroxy compound.

Where a higher molecular weight material is desired, approximately two moles, about 1.53 parts by weight, of toluene diisocyanate and one mole, about 1.0 part by weight, of bisphenol-A are placed in a reaction vessel and heated with stirring to a temperature of approximately 125° C. until all of the bisphenol-A has gone into solution. The reaction mixture is then cooled to about 100° C. and about two moles, 1.14 parts by weight, of hydroxy ethyl methacrylate are slowly metered into the solution with constant stirring. Generally, an inert solvent is employed to prevent the reaction mixture from becoming too viscous. The reaction proceeds smoothly and is permitted to come to room temperature slowly with constant stirring. The resultant product is also a clear yellow liquid having a viscosity of about 100 cps. This reaction may also be conducted in the absence of an inert solvent, thus obviating the necessity of separating and purifying the reaction product.

THE SEALANT FORMULATION

The sealant compositions of the present invention may be prepared by admixing with the polyurethane or polyureide monomer a polymerization catalyst or initiator which remains inactive while the sealant formulation is in contact with air, but which promotes rapid polymerization of the monomer when the composition is placed between metallic surfaces so as to exclude the presence of air. Suitable initiators falling within this category are the peroxy catalysts set forth in United States Patent No. 3,043,820 to Robert H. Krieble. Illustrative of these peroxy catalysts are the hydroperoxides comprising hydrogen peroxide and the entire class of organic hydroperoxides including the readily hydrolyzable peresters such as t-butyl perbenzoate. However, for the purposes of the present invention, the preferred catalysts are the organic hydroperoxides such as cumene hydroperoxide and t-butyl hydroperoxide. These catalysts may be used in concentrations as low as 0.01% by weight, however, it is generally preferred to utilize the catalysts in sufficient quantities to provide approximately 1% to 10% by weight of the catalyst in order to provide optimum speed in curing as well as prolonged storage capabilities. Although amounts in excess of 15% by weight may at times be employed it has generally been found that such additional amounts provide no additional beneficial effect and in fact, have a tendency to act as a diluent for the cured composition.

It is further an advantage of the present invention that the foregoing composition may include various additives such as accelerators or inhibitors, the addition of which tends to vary the adaptability of the composition to numerous and varied applications. Typical of such additives are the quinone and hydroquinone inhibitors or stabilizers and the tertiary amine and imide accelerators. These additives are generally employed in quantities of less than 10% by weight and in the case of the inhibitors are usually present in amounts from about 10 to 1,000 parts per million.

The composition of the present invention may be mixed at ambient temperatures for periods of months and even years prior to actual use and may be stored for such periods at room temperature without any evidence of gelling. It is only necessary that there be present a moderate amount of air or oxygen which is conveniently provided by a small volume of air in a properly shaped air permeable container, preferably of polyethylene or similar material. However, upon exclusion from air by placement between adjacent metal surfaces, the sealant composition will rapidly polymerize to form a strong bond, which polymerization can be further accelerated by the use of elevated temperatures, although it is an advantage of the present invention that such elevated temperatures are not necessary since these compositions form strong bonds at ambient temperatures within a short period of time.

Because of the efficacy of these sealant compositions, only small amounts are necessary to bond mating surfaces, and a few drops of the composition will suffice for bonding the cooperating threads of a nut and bolt. The surfaces to which the sealant is to be applied should be free from grease or contamination prior to application. When used on softer metals, such as aluminum and copper, or when the engagement ratio between the members to be joined is high, it may be desirable to reduce the shear strength produced by the sealant mixture through the incorporation of compatible diluents.

The compositions are nonvolatile and may be varied in viscosity by means of the particular monomer selected and by use of thickening or diluting agents. It is generally desirable to have a thin liquid of low viscosity having good capillary action for purposes of bonding closely fitting surfaces or for bonding previously assembled parts by penetration of the sealant composition between the mating surfaces. In bonding loose fitting surfaces or for filling large spaces or voids, high viscosity sealant compositions are preferable.

The sealant compositions may be applied dropwise and allowed to penetrate between adjacent surfaces through capillary action or the parts may be precoated in tumbling, spraying or dipping operations. Most metals will catalyze the cure of the sealant compositions; however, certain metals such as cadmium and zinc do not exhibit the catalytic speed of other metal surfaces and it is preferred to treat one or both of the mating surfaces with a heavy metal compound which is soluble in the sealant mixture, such as ferric chloride, cobalt, manganese, lead, copper and iron soaps.

To determine the long term or shelf-stability of the sealant compositions, a simple but effective test has been developed. The sealant is placed in suitable containers, such as test tubes, which are then placed in a temperature controlled environment, such as a water bath maintained at $82 \pm 1°$ C. At the end of predetermined intervals, generally ten minutes or less, a glass rod is dropped into the sealant. If the rod strikes the bottom of the test tube the composition has not gelled. When the viscosity of the gelling sealant prevents the rod from striking the bottom, the time is noted. It has been found that a sealant still free from gelling for thirty minutes or more during this accelerated heat aging test will be free from gelling at ambient temperatures in the presence of oxygen for at least one year, which is the commercially desirable minimum shelf life.

To test the activity of the sealant composition of the present invention, simple tests are available. For one test, several drops of the sealant mixture are placed between two elongated plates of glass or metal or combinations thereof, preferably at right angles to each other. When it is possible to move the two plates as a unit by manipulating one of the plates it is evident that polymerization has taken place. In general, such a degree of polymerization within several hours is considered satisfactory for most purposes, although longer periods are permissible for some applications where bond strength is not required immediately.

In another and preferred test for activity, the strength of the bond between threaded members is determined by placing several drops of the sealant on the mating threads of a nut and bolt, tightening the nut to a predetermined torque, and allowing the sealant to set and cure, generally at room temperature. In some instances, the break-loose torque is noted, but conventionally the prevailing torque is the measure of bond strength. To obtain the prevailing torque for the bond, the torque required to turn the bolt or screw at several, usually four or five, points after the break-loose torque and up to one full turn are averaged. For example, the torques required at ¼, ½, ¾ and 1 turn are taken and averaged. Commercially, a bolt sealant developing a prevailing torque of one foot pound on ⅜ inch full nuts is considered satisfactory.

The following examples are given in order that the effectiveness of the present invention may be more fully understood. These examples are set forth for the purpose of illustration only and are not intended to in any way limit the practice of the invention. Unless otherwise specified, all parts are given by weight.

Example I

In a reaction vessel was placed about 87 grams (one molar equivalent) of toluene diisocyanate to which was added with stirring approximately 65 grams (one molar equivalent) of hydroxy ethyl methacrylate. An exothermic reaction immediately set in which caused a temperature rise from room temperature up to about 240° F. within a period of approximately 10 minutes. With constant stirring so as to facilitate uniform reaction and cooling of the reaction mixture, there was slowly added, using approximately 10 gram increments sufficient hydroxy ethyl methacrylate to provide a total of approximately 131 grams (two molar equivalents). Upon completion of the addition, the reaction mixture was stirred constantly and permitted to cool slowly to room temperature.

To a 50 gram sample of the above reaction product there was added about 2.5 grams of cumene hydroperoxide and 0.03 gram of quinone. This formulation was then tested for stability at 82° C. and was found to exhibit a stability of greater than 25 minutes. When a few drops of the sealant composition were placed between the threads of a ⅜ inch nut and bolt they quickly solidified forming a bond which exhibited a prevailing torque of 37 foot pounds.

Example II

The procedure of Example I was repeated using a total of only 65 grams (one molar equivalent) of hydroxy ethyl methacrylate. The reaction mixture yielded a clear yellow liquid which slowly reacted with water to yield a waxy solid material. The formation of this material may be represented by the following equation:

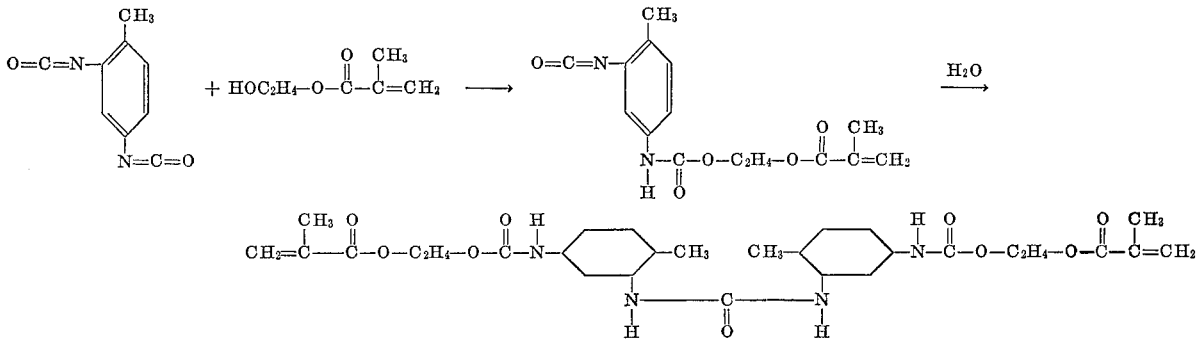

About 50 grams of the waxy polyurethane ureide product was dissolved in about 50 cc. of isobutyl methacrylate. To this solution was added about 3 grams of cumene hydroperoxide and 0.035 grams of quinone. The formulation exhibited a stability of 30 minutes at 82° C. and, when applied to the threads of a nut and bolt assembly, quickly cured at room temperature to give a prevailing torque of 15 foot pounds.

Example III

In a reaction vessel was placed approximately 200 grams (one molar equivalent) of decamethylene glycol adipate and approximately 34.8 grams (two molar equivalents) of toluene diisocyanate. The mixture was heated with stirring to about 80° C. and maintained at about this temperature until the initial reaction had gone to completion. The reaction vessel temperature was then reduced to about 75° C. and an excess of 26 grams (two molar equivalents) of hydroxy ethyl methacrylate was slowly added thereto. The resultant product was a clear, light yellow viscous liquid to which was added about 100 cc. of isobutyl methacrylate. To 100 grams of the monomer solution containing about 75 grams of the monomer and 25 grams of isobutyl methacrylate was added approximately 2.5 grams of cumene hydroperoxide and 0.03 gram of quinone. Drops of this formulation were placed on the threads of metal fasteners and nuts were hand tightened thereon. After approximately 3 hours at room temperature a prevailing torque of 25 foot pounds was measured.

Example IV

In a reaction vessel was placed approximately 174 grams (two molar equivalents) of toluene diisocyanate and approximately 114 grams (one molar equivalent) of bisphenol-A. The mixture was heated with agitation to approximately 125° C. after which it was permitted to cool until it became slightly cloudy. When the temperature reached 95° C. approximately 131 grams (two molar equivalents) of hydroxy ethyl methacrylate was metered into the solution dropwise over a period of time and the mixture was constantly stirred so as to dissipate the heat created by the exothermic reaction. The resultant solution was allowed to slowly cool yielding a clear yellow liquid having a viscosity of about 100 cps. To about 75 grams of this yellow liquid was added approximately 25 grams of isobutyl methacrylate, about 1.0 gram of tertiary butyl hydroperoxide and approximately 0.03 gram of quinone. The formulation exhibited a stability of greater than 30 minutes at 82° C. and when applied to a nut and bolt resulted in a prevailing torque of greater than 47 foot pounds.

Example V

Into a reaction vessel adapted for heating, agitation and cooling was charged about 174 grams (two molar equivalents) of toluene diisocyanate. The isocyanate was heated to about 100° C. with stirring and approximately 120 grams (one molar equivalent) of hydrogenated bisphenol-A was slowly added thereto so as to control the temperature rise caused by the exothermic reaction. During the addition of the hydrogenated bisphenol-A there was added to the reaction mixture some isobutyl methacrylate solvent to dilute the reaction mixture which tended to thicken as the reaction proceeded. Upon completion of the initial reaction, and upon reduction of the temperature of the reaction mixture to about 100° C. there was slowly added with constant stirring about 130 grams (two molar equivalents) of hydroxy ethyl methacrylate.

A sealant formulation was prepared by adding to about 100 grams of the reaction product about 2 cc. of cumene hydroperoxide and 0.03 gram of quinone. The formulation exhibited excellent stability and good bonding characteristics.

Example VI

Example V was repeated using two molar equivalents of diphenyl methane 4,4'-diisocyanate in place of the toluene diisocyanate. This formulation also exhibited a shelf-stability of more than 30 minutes at 82° C. and good bonding characteristics.

Example VII

In a reaction vessel was placed approximately 174 grams (two molar equivalents) of toluene diisocyanate. To this was slowly added, without heating, about 172 grams (one molar equivalent) of propoxylated bisphenol-A. Upon completion of the initial reaction there was added with stirring approximately 130 grams (two molar equivalents) of hydroxy ethyl methacrylate. The reaction proceeded smoothly and the temperature was maintained below 65° C. To approximately 200 grams of the reaction product was added 4 cc. of cumene hydroperoxide, 0.03 gram of quinone, and 0.8 gram of benzoic sulfimide. The formulation exhibited good shelf-stability and excellent bonding properties.

Example VIII

About 174 grams (one molar equivalent) of toluene diisocyanate and 144 grams (one molar equivalent) of 2-hydroxypropyl methacrylate were charged into a reaction vessel at room temperature. During the course of the reaction the temperature rose to about 175° F. as one additional molar equivalent of the 2-hydropropyl methacrylate was added. To about 50 grams of the clear, amber liquid reaction product was added about 50 grams of isobutyl methacrylate solvent and about 2.0 grams of cumene hydroperoxide. The resultant formulation exhibited excellent sealant properties.

Example IX

In a suitable vessel was reacted about 250 grams (one molar equivalent) of 4,4'-diphenylene methane diisocyanate and about 288 grams (two molar equivalents) of 2-hydroxypropyl methacrylate to produce a very viscous yellow liquid reaction product. To 50 grams of the product was added about 35 grams of isobutyl methacrylate solvent and 2.0 grams of cumene hydroperoxide. The resultant formulation showed satisfactory sealant properties.

As will be apparent to persons skilled in the art, various modifications and adaptations of the formulations above described will become readily apparent without departure from the spirit and scope of the invention, the scope of which is defined in the appended claims.

We claim:

1. A formulation adapted to remain fluid in the presence of air and rapidly cure at ambient temperature upon confinement between closely positioned adjacent surfaces comprising:
    (A) a polymerizable monomer prepared by reacting at a temperature between about 10° C. and about 175° C.: (i) an organic polyisocyanate; and (ii) an acrylate ester containing a hydroxy or amino group in the non-acrylate portion thereof, the ester being used in sufficient amount to react with substantially all of the isocyanate groups of the polyisocyanate; and
    (B) a hydroperoxy polymerization initiator.
2. The formulation of claim 1 wherein (ii) is an acrylate ester having an XH substituent in the non-acrylate portion thereof, X being selected from the group consisting of —O— and

wherein R is selected from the group consisting of hydrogen and lower alkyl of 1 to 7 carbon atoms.

3. The formulation of claim 1 wherein the organic polyisocyanate is the reaction product of toluene diisocyanate and polyethyleneglycol.
4. The formulation of claim 1 wherein the organic polyisocyanate is selected from the group consisting of toluene diisocyanate, 4,4'-diphenylenemethane diisocyanate, 1,5-naphthylene diisocyanate, trimethylene diisocyanate, tetramethylene diisocyanate, hexamethylene diisocyanate, and cyclohexylene diisocyanate.
5. The formulation of claim 1 wherein the acrylate ester is hydroxyethylmethacrylate.
6. The formulation of claim 1 wherein the hydroperoxy initiator is an organic hydroperoxide.
7. The formulation of claim 1 wherein the organic polyisocyanate is the reaction product of toluene diisocyanate and 4,4'-diphenyldimethylmethane.
8. A formulation adapted to remain fluid in the presence of air and rapidly cure at ambient temperature upon confinement between closely positioned adjacent surfaces comprising:
    (A) a polymerizable monomer prepared by reacting at a temperature between 10° C. and 175° C.:
        (i) an organic polyisocyanate; and
        (ii) an acrylate ester of the formula:

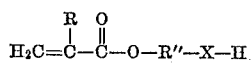

wherein X is selected from the group consisting of —O— and

R is selected from the group consisting of hydrogen and lower alkyl of 1 through 7 carbon atoms; R' is a member selected from the class consisting of hydrogen, chlorine, methyl, and ethyl; and R" is a divalent hydrocarbon radical selected from the group consisting of lower alkylene of 1 through 8 carbon atoms, phenylene and naphthylene, the ester being used in sufficient amount to react with substantially all of the isocyanate groups of the polyisocyanate; and
    (B) a hydroperoxy polymerization initiator.
9. The formulation of claim 8 wherein the organic polyisocyanate is selected from the group consisting of toluene diisocyanate, 4,4'-diphenylenemethane diisocyanate, 1,5-naphthylene diisocyanate, trimethylene diisocyanate, tetramethylene diisocyanate, hexamethylene diisocyanate, and cyclohexylene diisocyanate, and the hydroperoxy initiator is an organic hydroperoxide.
10. The formulation of claim 8 wherein X is oxygen, and R is hydrogen or methyl.

References Cited

UNITED STATES PATENTS

| 2,958,704 | 11/1960 | Dinbergs et al. | 260—468 |
| 3,178,380 | 4/1965 | Basel | 260—21 |
| 3,313,789 | 4/1967 | Naarmann et al. | 260—80.5 |
| 3,367,992 | 2/1968 | Bearden | 260—837 |
| 3,245,941 | 4/1966 | Mayer et al. | 260—31.6 |
| 2,846,416 | 8/1958 | Arnold et al. | 260—77.5 |
| 3,028,367 | 4/1962 | O'Brien | 260—77.5 |
| 3,178,380 | 4/1965 | Porret | 260—21 |
| 3,245,941 | 4/1966 | Mayer et al. | 260—31.6 |
| 3,284,415 | 11/1966 | Horvath | 260—77.5 |
| 3,313,789 | 4/1967 | Naarmann et al. | 260—80.5 |

FOREIGN PATENTS

| 579,231 | 7/1959 | Canada. |
| 807,199 | 1/1959 | Great Britain. |
| 571,509 | 3/1959 | Canada. |
| 743,514 | 1/1956 | Great Britain. |

OTHER REFERENCES

Chemical Abstracts, volume 53, page 11859.

DONALD E. CZAJA, Primary Examiner.

F. McKELVEY, Assistant Examiner.

U.S. Cl. X.R.

260—77.5, 31.2, 33.6, 32.8, 45.95, 75; 161—190, 219; 156—331